United States Patent [19]

Stephens

[11] Patent Number: 5,782,577
[45] Date of Patent: Jul. 21, 1998

[54] ROADWAY MEDIAN STRIPE PROTECTIVE METHOD

[76] Inventor: Dan Stephens, 2360 S. 3270 West, Salt Lake City, Utah 84119

[21] Appl. No.: 689,309

[22] Filed: Aug. 7, 1996

[51] Int. Cl.⁶ .................. E01F 9/00; B05D 5/00
[52] U.S. Cl. .................. 404/14; 404/75; 404/82; 427/137
[58] Field of Search .................. 404/12, 14, 15, 404/16, 19, 21, 75, 81, 82, 94; 427/137; 428/325

[56] References Cited

U.S. PATENT DOCUMENTS

| | | | |
|---|---|---|---|
| 2,897,732 | 8/1959 | Shuger | 404/14 |
| 3,030,870 | 4/1962 | Gill, Jr. | 404/14 X |
| 3,204,537 | 9/1965 | Searight | 404/14 X |
| 3,879,148 | 4/1975 | Eigenmann | |
| 3,890,054 | 6/1975 | O'Connor | |
| 3,958,891 | 5/1976 | Eigenmann | |
| 4,069,281 | 1/1978 | Eigenmann | |
| 4,685,824 | 8/1987 | Eigenmann | 404/12 X |
| 4,751,140 | 6/1988 | Ishihara | |
| 4,856,931 | 8/1989 | Bollag | 404/75 |
| 5,053,253 | 10/1991 | Haenggi et al. | 427/137 X |
| 5,124,178 | 6/1992 | Haenggi et al. | 427/137 X |
| 5,257,875 | 11/1993 | Flanagan | |
| 5,308,186 | 5/1994 | Hedgewick | |
| 5,310,278 | 5/1994 | Kaczmarczik et al. | |
| 5,380,549 | 1/1995 | Harvison | 427/137 |
| 5,422,162 | 6/1995 | Passarino et al. | 404/14 X |
| 5,453,320 | 9/1995 | Harper et al. | 404/14 X |
| 5,593,246 | 1/1997 | Hedblom et al. | 404/14 X |

FOREIGN PATENT DOCUMENTS

| | | | |
|---|---|---|---|
| 0665665 | 5/1988 | Switzerland | 404/14 |

*Primary Examiner*—James Lisehora
*Attorney, Agent, or Firm*—Thorpe, North & Western, LLP

[57] ABSTRACT

A method for protecting reflective delineator stripes includes the use of spacer beads disposed along the stripe to protect reflective beads disposed thereon. The spacer beads are of a greater diameter than the reflective beads so that snowplow blades and the like will contact the spacer beads but not the reflective beads. As the snowplow blades impact the spacer beads, the snowplow blades travel along the top of the spacer beads, thereby avoiding contact with the reflective beads.

20 Claims, 3 Drawing Sheets

ROADWAY MEDIAN STRIPE PROTECTIVE METHOD

BACKGROUND OF THE INVENTION

1. Field of the Invention

The present invention relates to a method for protecting a reflective delineator stripe disposed along a roadway from damage when a snowplow blade passes over the reflective delineator stripe. More particularly, the present invention relates to a method wherein a plurality of line protectors are disposed along the reflective delineator stripe to lift the snowplow blade above the reflective beads which are attached to the roadway surface to form the reflective delineator stripe, thereby preventing damage to the reflective beads by the blade and extending the life of the reflective delineator stripe.

2. State of the Art

The use of reflective delineator stripes or coatings on roadways to delineate boundaries and provide other information is well known. Often, the reflective delineator stripe is formed by applying a coating of adhesive to a roadway surface and then applying a plurality of beads to the coating or adhesive. This is most often accomplished simultaneously with the application of paint or some other marking agent which provides a visible delineator during daylight hours when most motorists do not use their vehicle's headlights, and when the ambient light typically overwhelms the reflected light.

One concern which has developed with the use of such beads is the high rate of wear caused by traffic and other conditions. One manner in which many reflective delineator stripes becomes damaged is the wear created by snowplow blades. The snowplow blades are designed to clear the roadway of snow and ice, and therefore continually engage the roadway. When such a blade contacts a reflective surface formed by a plurality of reflective beads, the blade will often impact the reflective beads with sufficient force to break many of the beads free from their adhesive bond to the roadway. After many passes by a snowplow blade, a sufficient number of reflective beads typically will have worn off so that the reflectance provided by the delineator stripe is significantly diminished.

An additional problem which is raised by the loss of the reflective beads is that the painted surface which remains has a tendency to be slippery when wet. Thus, if a sufficient number of the reflective beads are removed from the roadway, the delineator stripe can actually increase the likelihood of an accident due to loss of friction between the road and tires of an automobile.

Numerous different approaches have been attempted to overcome this problem. For example, in U.S. Pat. No. 3,890,054, there is shown a flexible highway marker. The highway marker is formed by a plurality of flexible fingers which have reflective materials disposed thereon. When impacted by a snowplow blade, the fingers deform, thereby allowing the blade to pass while minimizing the damage to the reflective materials.

Yet another approach is shown in U.S. Pat. No. 4,751,140. A plurality of reflective beads are disposed in a base sheet of rubber or resin formed with a plurality of protuberances and depressions. As the base sheet is subjected to wear, the surface of the base sheet is worn down so that additional reflective beads which were formerly disposed within the base sheet are disposed at the base sheet's new surface. Thus, although reflective beads are continually being worn off/out of the base sheet, the surface of the base sheet continues to contain reflective beads extending therefrom.

One problem with such an arrangement is that the base sheet must be sufficiently thick to hold several layers of reflective beads. At such a height, however, the high profile of the base sheet typically is more prone to the forceful impact of the snowplow blade, potentially tearing the base sheet from the roadway. Another problem with the embedded beads wearing to expose new beads theory is that the newly exposed beads wear at substantially the same rate as the plastic striping material. Thus, the beads do not project above the material, giving poor reflectivity, especially in wet conditions.

Thus, there is a need for an improved method for protecting median stripes and other delineator lines disposed on roadways. Such a method should be inexpensive and easy to apply with current technology. Such a method should also be formulated so as to significantly decrease the wear caused by snowplow blades and provide improved traction on the reflective delineator stripe.

SUMMARY OF THE INVENTION

Thus it is an object of the present invention to provide a method for protecting reflective surfaces disposed on roadways from wear caused by snowplows and the like.

It is another object of the present invention to provide such a method which is inexpensive and easy to apply both to reflective delineator stripes as they are applied to a roadway, and to existing reflective delineator stripes.

It is still another object of the present invention to provide such a method which improves the traction provided on the reflective surface when wet.

The above and other objects of the invention not specifically enumerated are realized in specific illustrated embodiments of a roadway median strip protective method which includes the application of a plurality of line protectors in the form of spacer/protective beads adjacent the reflective beads which form a reflective surface. The spacer beads are of a greater diameter than the reflective beads so that snowplow blades and the like will contact the spacer beads but not the reflective beads. As the snowplow blades impact the spacer beads, the snowplow blades travel along the top of the spacer beads, thereby avoiding contact with the reflective beads.

In accordance with one aspect of the invention, the spacer beads are formed from a durable material, such as metal, so that the spacer beads are sufficiently durable to withstand repeated impacts from snowplow blades and the like. Preferably, the spacer beads are spaced apart a distance less than the common thickness of snowplow blades for the area. As the snowplow blade contacts the spacer beads and follows the curvature of the spacer beads, it is lifted above the reflective beads so that it may not shear them from their adhesive bond with the roadway.

In accordance with another aspect of the invention, the spacer beads may be placed on the reflective surface as the reflective surface is formed on the roadway. In the alternative, the spacer beads may be applied to existing reflective surfaces to protect them from further wear by snowplow blades and the like.

In accordance with still another aspect of the present invention, the spacer beads are formed from small steel balls which are deformed by passing them through a roller press. The deformation provides a broader base so as to maximize the surface area of the bottom side along which the beads may be attached to a roadway, and provides a more gradual curve along the top side for lifting the snowplow blade and minimizing the force of impact between the snowplow blade and the spacer bead.

In accordance with a preferred application of the method of the present invention, a striping solution, such as white or yellow paint suitable for application to the road surface, is selected for forming a delineator stripe. A plurality of reflective beads and spacer beads are selected and mixed together so that the reflective beads out number the spacer beads at least two to one. The spacer beads selected are larger in diameter than are the reflective beads so that the spacer beads extend above the reflective beads when disposed on the roadway.

The striping solution is then applied to the road surface to provide a delineator line. The mixture of reflective beads and spacer beads is then applied to the road surface. The striping solution can contain an adhesive or other bonding material for holding the beads, an adhesive/bonding layer may be applied over the striping solution, or the beads can be coated with an adhesive when they are applied to the striping solution. Which ever method is employed, the reflective beads and the spacer beads are bonded to the roadway, the reflective beads providing enhanced visibility and the spacer beads protecting the reflective beads from impacts from snowplow blades.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
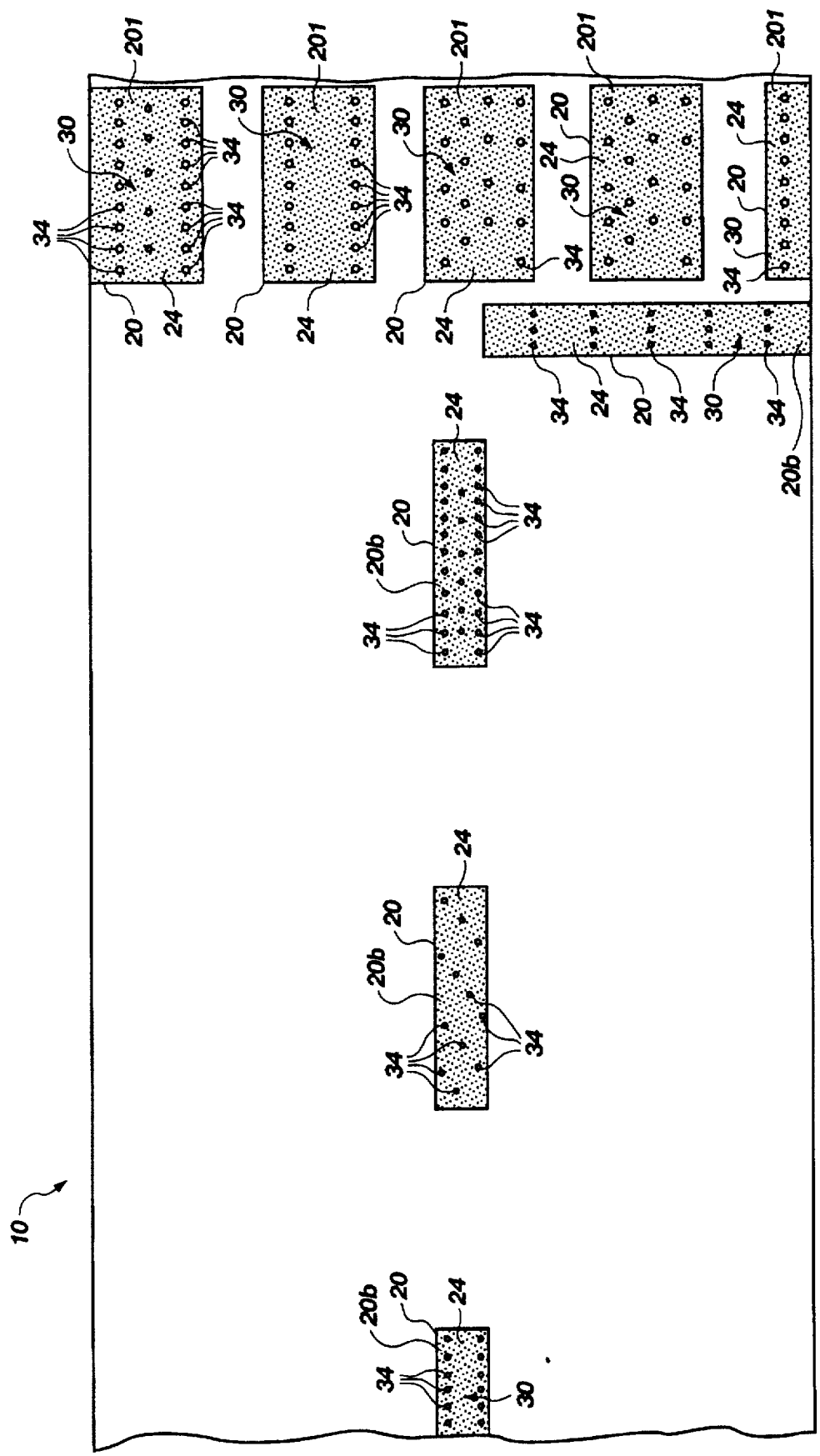
FIG. 1 shows a fragmented top view of a roadway with a plurality of delineator stripes disposed thereon in accordance with the principles of the present invention.

Referring to FIG. 1, there is shown a top view of a roadway, generally indicated at 10, with a plurality of delineator stripes 20 disposed thereon. Each of the delineator stripes is formed by a striping material 24, such as white or yellow paint. The striping material 24 provides a clear indication of the designated boundary during daylight hours. However, at night, it is often difficult to see the painted lines, especially at a distance. To overcome this problem, the striping material 24 has a large number of small reflective beads, generally indicated at 30 which are disposed thereon. The reflective beads 30 reflect back the light emitted by automobile headlights to make the delineator stripes 20 more visible during evening, night and other periods of low light.

A common problem with the delineator stripes 20 is that the reflective beads 30 are worn off as the roadway 10 is used. This is especially true when snowplows are used to clean snow and ice off the roadway 10. The snowplow blade forcefully contacts the reflective beads 30 and breaks them free from their adhesive. When a sufficient quantity of the reflective beads 130 has been removed, the reflective stripes 20 lose their ability to reflect light to any noticeable degree and become more difficult to see during low light periods, such as evening, night and early morning.

In accordance with the present invention, it has been found that applying a plurality of spacer beads, some of which are indicated at 34, can significantly improve the useful life of the reflective delineator stripe 20. The spacer beads 34 are made from a durable material, such as metal, and are selected to have a diameter larger than that of the reflective beads 30. As a snowplow blade passes over the reflective delineator stripes 20, the spacer beads 34 cause the blade to be lifted up to a level above the reflective beads 30. Thus, the spacer beads 34 form a surface across which the snowplow blade moves, the surface being above the tops of the reflective beads 30. However, because the spacer beads 34 are spaced around the reflective delineator stripes 20, they provide minimal interference with light reflected from the reflective beads 30. To further ensure that the spacer beads 34 do not interfere with the reflected light, the number of reflective beads 30 to spacer beads is typically at least 2 to 1.

As is shown on reflective delineator stripes 20a, the spacer beads 34 can be randomly disposed along the reflective delineator stripe. In the alternative, as is shown on reflective delineator stripes 20b, the spacer beads 34 can be disposed in any predetermined pattern. For example, the spacer beads 34 could be placed in lines extending linearly from one end to the other, or can be provided in a striped arrangement, each stripe extending transverse to the reflective delineator stripe 20. In order to maximize reflectance, the stripes of spacer beads 34 could be positioned to maximize visibility of the reflective beads 30, as is shown on reflective delineator stripe 20c, while protecting the reflective beads 30 from damage.

Figure 2:
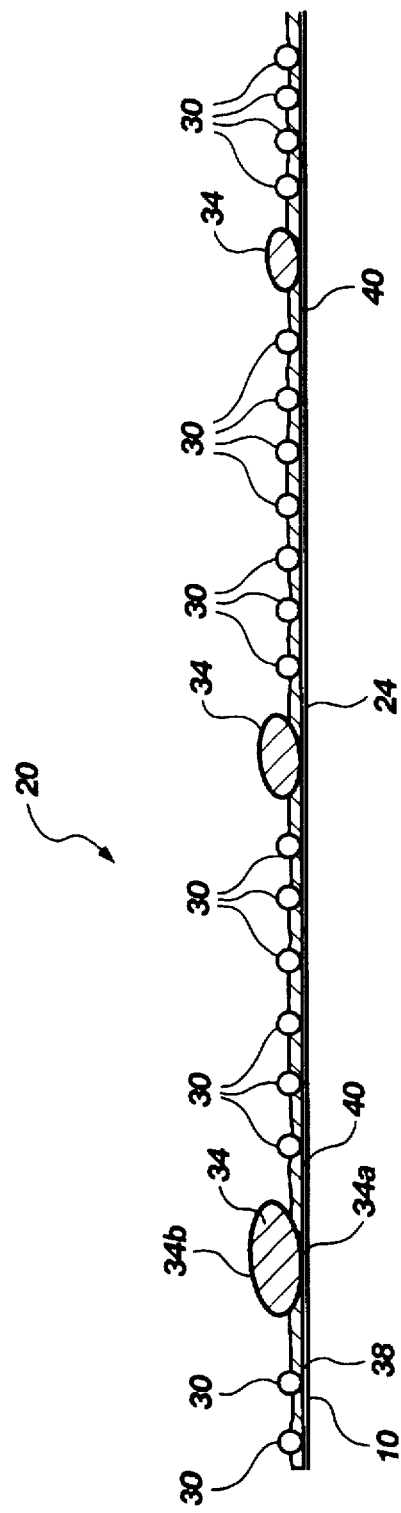
FIG. 2 shows a cross-sectional view of one of the stripes of FIG. 1.

Referring now to FIG. 2, there is shown a cross sectional view of a reflective delineator stripe, generally indicated at 20, as shown in FIG. 1. The reflective delineator stripe 20 is formed on the roadway 10. As shown in FIG. 2, the striping material 24 is applied to the roadway 10. The striping material 24 includes both a marking agent 38, such as white or yellow paint, and an adhesive agent 40 for bonding the reflective beads 30 and the spacer beads 34 to the roadway. The adhesive agent 40 will typically be epoxy of the type currently used on delineator stripes.

In the alternative, the striping material may be simply a marking agent and the adhesive can be applied in a separate step. This is likely to be the case when the striping material 24 remains in good condition, but is desired to add spacer beads 34 or spacer beads and reflective beads 30.

Unlike the reflective beads 30 which are typically round, the spacer beads 34 are generally oblong or somewhat flattened. As will be discussed briefly with respect to FIG. 3, this is accomplished by passing metallic BBs through a roller press. The elongated shape of the space beads provides several advantages. First, the bottom side 34a of the spacer bead 34 is provided with a flatter bottom. This provides the spacer bead 34 with a greater surface area with which to bond to the adhesive and thus the roadway. Second, the spacer bead 34 is provided with an upper side 34b which has a much smaller curvature than a sphere. This smaller curvature allows a snowplow blade to be forced over the spacer bead 34 more gradually and significantly lessens the shearing force which the snowplow will apply to the space beads. By reducing the shearing force, the life of the space bead 34 can be extended a considerable amount of time.

The exact distance between each spacer bead 34 will depend on the desired amount of protection to be provided. For example, on a heavily traveled and heavy plowed urban street, the spacer beads may be positioned very close to one another, i.e. 0.25 inches or less. On less traveled and less frequently plowed rural roads, the spacer beads 34 may be positioned so that each spacer bead is within about 1.5 inches from the next nearest spacer bead.

The diameter of the reflective beads 30 is typically between 0.0029 and 0.0662 inches. To prevent a snowplow blade from forcefully contacting reflective beads, the spacer beads 34 should have a diameter (vertical height) of not less than 0.0035 inches (if very small beads are used), and preferably about 0.1 inches. Of course, different size spacer beads 34 could be provided if desired.

As has been alluded to earlier, there are numerous different methods for applying the spacer beads 34 to protect the reflective beads. For example, when applying a reflective delineator stripe 20 to a new road, or when applying a new reflective delineator stripe to an older road, the following steps would typically be followed. First, the person applying the reflective delineator stripe would select a striping solution suitable for application to the road surface. He or she would then select reflective beads 30 which are configured for use as a night reflective medium responsive to vehicle headlights. The spacer beads 34 would then be selected so that the spacer beads were slightly greater in diameter than the reflective beads. The reflective beads and the spacer beads would then be mixed together, preferably in a ratio of at least two reflective beads for each spacer bead. The striping solution would then be applied to the road surface. Finally, the mixture of reflective beads 30 and spacer beads 34 would be applied to the striping solution on the road surface. In such a situation, the striping solution 24 would usually include the marking agent 38 and the adhesive agent 40. However, the mixture of reflective beads 30 and spacer beads 34 could be coated with an adhesive instead or a layer of adhesive could be applied over the marking agent 38 and prior to application of the reflective beads and the spacer beads.

Figure 3:
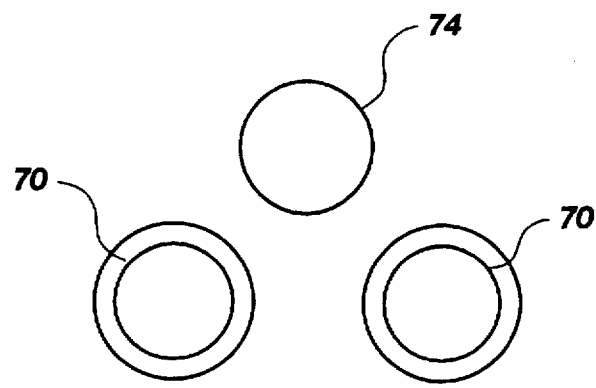
FIG. 3 shows a metallic BB being passed through a roller press to form a spacer bead with a relatively large bottom side for bonding to the roadway, and a relatively large top side to provide a gradual curvature along which a snowplow blade may pass.

Referring now to FIG. 3, there is shown a side view of the rollers 70 of a roller press. A BB 74 is disposed so as to pass through the rollers 70, thereby obtaining the oblong shape shown in FIG. 2. The BBs are preferably made out of stainless steel, although other metals which do not readily corrode when exposed to inclement weather may also be used. Because the BBs 74 will be deformed by the rollers 70, it is acceptable to use seconds, i.e. BBs which were not of a proper shape or had some other flaw which prevented their use as bearings, etc. Rather than remelting the seconds and then recasting them, the present invention makes use of the BBs 74 to protect the reflective beads 30 disposed along a reflective delineator stripe 20.

Thus there is disclosed an improved method for protecting reflective delineator stripes disposed along a roadway. Those skilled in the art will appreciate that numerous modifications may be made without departing from the scope and spirit of the present invention. The appended claims are intended to cover such modifications.

What is claimed is:

1. A method for applying a reflective striping to a roadway surface wherein the reflective striping is protected against degradation by abrasive contact of a snowplow blade, said method comprising the steps of:

a) selecting a striping solution suitable for application to the road surface;

b) selecting reflective beads which are configured for use as a night reflective medium responsive to vehicle headlights;

c) selecting spacer beads which are slightly greater in diameter than the reflective beads of the previous step and resistive to abrasive contact of a snowplow blade and which are formed of a metallic material;

d) mixing the reflective beads with the spacer beads wherein there are at least two reflective beads for each spacer bead;

e) applying the striping solution to the road surface; and f) adhering the mixture of step d) to the applied striping solution on the road surface.

2. A method as defined in claim 1, comprising the more specific step of selecting a striping solution of paint useful as centerline striping separating lanes of traffic on the roadway.

3. A method as defined in claim 1, comprising the more specific step of selecting reflective beads having a diameter within the range of 0.0029 to 0.0662 inches, and selecting spacer beads having a diameter of 0.0035 to 0.10 inches.

4. A method as defined in claim 1, comprising the more specific steps of:

a) applying adhesive to the striping solution on the road surface;

b) placing the mixture of reflective beads and spacer beads in the adhesive so that the spacer beads are dispersed among the reflective beads to provide a support surface which prevents adverse contact of abrasive objects at the reflective beads.

5. The method of claim 1, wherein step (a) comprises, more specifically, selecting a striping solution containing an adhesive for bonding the reflective beads and the spacer beads to the roadway.

6. The method of claim 1, wherein step (f) comprises, more specifically, applying an adhesive agent to the striping solution and placing the mixture of step (d) in the adhesive agent.

7. The method of claim 1, wherein step (f) comprises, more specifically, coating the mixture of step (d) with an adhesive agent and then disposing the adhesive coated mixture on the striping solution.

8. A method for protective roadway delineator stripes having a reflective surface formed by a plurality of reflective beads disposed on the roadway for protecting the reflective surface from damage by snowplow blades and the like, the method comprising:

a) selecting a plurality of protector beads having a diameter larger than the reflective beads, the protector beads being formed of metal;

b) disposing the protector beads along the reflective surface and adjacent the reflective beads in such a manner that the protector beads extend upwardly from the roadway higher than the reflective beads; and c) attaching the protector beads to the roadway along the reflective surface so that the protector beads lift a blade of a snowplow above the reflective beads when the snowplow the blade passes over the reflective surface to thereby minimize contact between the blade and the reflective beads.

9. The method of claim 8, wherein the method further comprises combining the reflective beads and the protector beads to form a mixture, and then applying the mixture to the roadway to form a reflective surface having protector beads disposed thereon.

10. The method of claim 9, further comprising the step of applying a striping solution to the roadway prior to application of the mixture.

11. The method of claim 9, wherein the method comprises, more specifically, applying an adhesive agent to the roadway, and then applying the mixture to the adhesive agent to bond the reflective beads and the protector beads to the roadway.

12. The method of claim 8, wherein the method further comprises applying the protector beads to the reflective surface in a pattern.

13. The method of claim 12, wherein a plurality of protector beads are placed on the reflective surface in a line.

14. The method of claim 8, wherein the protector beads are disposed on reflective surface such that each protector bead is not greater than 1.5 inches from an adjacent protector bead.

15. A method for protecting a reflective surface having a plurality of reflective beads adhesively attached to a roadway from damage caused by snowplow blades, the method comprising:

a) selecting a durable material which is resistant to damage when contacted by a metallic snowplow blade, said durable material being a metal, and of a different material than the materials forming the reflective beads;

b) forming a plurality of the spacer beads from the durable material;

c) disposing a plurality of the spacer beads of the durable material adjacent the reflective beads of the reflective surface in such a manner that the spacer beads extend above the reflective beads; and d) bonding the spacer beads to the reflective surface.

16. The method of claim 15, wherein the method comprises, more specifically, coating the spacer beads with an adhesive and then disposing the adhesive coated spacer beads on the reflective surface.

17. The method of claim 15, wherein the method comprises, more specifically, coating the reflective surface with adhesive prior to disposing the spacer beads adjacent the reflector beads.

18. A method for protecting a plurality of reflective beads disposed on a roadway to form a reflective surface from damage caused by snowplow blades, the method comprising:

a) selecting a plurality of metallic spacer beads which are sized larger than the reflective beads;

b) spacing the metallic spacer beads apart on the reflective surface a distance less than the thickness of a snowplow blade; and c) adhesively attaching the spacer beads to the roadway.

19. A method for protecting a plurality of reflective beads disposed on a roadway so as to form a reflective delineator stripe, the reflective beads having a first size, and the method comprising:

a) selecting a plurality of metallic beads having a second size larger than the first size of the reflective beads;

b) disposing the metallic beads along the reflective delineator stripe in proximity to one another such that when a snowplow blade passes over the delineator strip, the metallic beads hold the snowplow blade above the reflective beads; and c) fixedly attaching the metallic beads to the roadway.

20. The method of claim 19, wherein step (a) comprises, more specifically, selecting a plurality of stainless steel BBs, and wherein step (c) comprises adhesively attaching the stainless steel BBs to the roadway.

* * * * *